(12) United States Patent
Kobayashi et al.

(10) Patent No.: US 9,481,339 B2
(45) Date of Patent: Nov. 1, 2016

(54) GAS GENERATOR

(71) Applicant: DAICEL CORPORATION, Osaka-shi, Osaka (JP)

(72) Inventors: Tomoharu Kobayashi, Tatsuno (JP); Mikio Yabuta, Tatsuno (JP)

(73) Assignee: DAICEL CORPORATION, Osaka-Shi (JP)

( * ) Notice: Subject to any disclaimer, the term of this patent is extended or adjusted under 35 U.S.C. 154(b) by 0 days.

(21) Appl. No.: 14/784,212

(22) PCT Filed: Mar. 20, 2014

(86) PCT No.: PCT/JP2014/057838
§ 371 (c)(1),
(2) Date: Oct. 13, 2015

(87) PCT Pub. No.: WO2014/174955
PCT Pub. Date: Oct. 30, 2014

(65) Prior Publication Data
US 2016/0068133 A1    Mar. 10, 2016

(30) Foreign Application Priority Data

Apr. 22, 2013   (JP) ................................ 2013-089159

(51) Int. Cl.
| B60R 21/274 | (2011.01) |
| B60R 21/264 | (2006.01) |
| B60R 21/26  | (2011.01) |

(52) U.S. Cl.
CPC ........... *B60R 21/264* (2013.01); *B60R 21/274* (2013.01); *B60R 2021/26029* (2013.01); *B60R 2021/26076* (2013.01)

(58) Field of Classification Search
CPC ... B60R 21/26; B60R 21/263; B60R 21/264; B60R 21/268; B60R 21/272; B60R 21/274
USPC .................. 102/530, 531; 280/736, 737, 741
See application file for complete search history.

(56) References Cited

U.S. PATENT DOCUMENTS 6,746,046 B2 *  6/2004  Rink ....................... B60R 21/26
                                                       137/68.13
6,786,507 B2 *  9/2004  Dolling ................ B60R 21/272
                                                       137/68.19

(Continued)

FOREIGN PATENT DOCUMENTS

JP    2002-347567 A    12/2002
JP    2003-226221 A     8/2003

(Continued)

OTHER PUBLICATIONS

International Preliminary Report on Patentability (PCT/IB/373) issued on Oct. 27, 2015 in application No. PCT/2014/057838.

(Continued)

*Primary Examiner* — James S Bergin
(74) *Attorney, Agent, or Firm* — Birch, Stewart, Kolasch & Birch, LLP

(57) ABSTRACT

The present invention provides a gas generator, including
a cylindrical housing having therein an ignition device chamber and a pressurized gas chamber,
a closing member in a circular shape having a fragile portion provided on one surface and closing between the chambers,
a piston being disposed inside the ignition device chamber and having a base plate and a rod that extends in the axial direction from one surface of the base plate to abut against or face the closing member,
the fragile portion being a groove formed with a curve extending from a start point A on Y1 to an end point E through a first intermediate point B on Y2, a second intermediate point C on Y1, and a third intermediate point D on Y2, where Y1 and Y2 are two straight lines drawn to be orthogonal to each other and to pass through a crossing point X2 on one surface of the closing member,
the groove formed so that distances from the crossing point X2 to the respective points satisfy the following relationship: the distance to the start point A<the distance to the first intermediate point B<the distance to the second intermediate point C<the distance to the third intermediate point D<the distance to the end point E, and that the end point E is one of points E1, E2 and E3, wherein E1 is a point crossing Y1 after passing through the third intermediate point D on Y2, E2 is a point closer to the third intermediate point D than to the crossing point E1, and E3 is a point that has passed by the crossing point E1,
the rod being not to come in contact with the start point A but pushing at a position close to the groove between the start point A and the first intermediate point B, and thereby the closing member being ruptured along the groove from the start point A to the end point E.

13 Claims, 6 Drawing Sheets

(56) References Cited

U.S. PATENT DOCUMENTS

| | | | |
|---|---|---|---|
| 6,834,885 B2* | 12/2004 | Mizuno | B60R 21/268 280/737 |
| 6,857,657 B2* | 2/2005 | Canterberry | B60R 21/272 280/737 |
| 7,607,688 B2* | 10/2009 | Kato | F42B 3/04 137/68.27 |
| 7,665,763 B2* | 2/2010 | Bjorklund | B60R 21/268 280/736 |
| 7,695,009 B2* | 4/2010 | Johanson | B60R 21/264 280/736 |
| 8,651,520 B2* | 2/2014 | Jung | B60R 21/272 280/737 |
| 8,870,222 B2* | 10/2014 | Kobayashi | B60R 21/274 280/736 |
| 2002/0180195 A1 | 12/2002 | Nanmu | |
| 2003/0146612 A1 | 8/2003 | Doi | |
| 2005/0206145 A1 | 9/2005 | Kato et al. | |
| 2008/0054611 A1 | 3/2008 | Johanson et al. | |
| 2012/0210905 A1 | 8/2012 | Hanano et al. | |
| 2015/0158455 A1* | 6/2015 | Ruckdeschel | B60R 21/264 280/741 |

FOREIGN PATENT DOCUMENTS

| | | |
|---|---|---|
| JP | 2005-238948 A | 9/2005 |
| JP | 2008-526615 A | 7/2008 |
| JP | 2011-51447 A | 3/2011 |
| JP | 2012-171362 A | 9/2012 |
| WO | WO 2012-161647 A1 | 11/2012 |

OTHER PUBLICATIONS

Written Opinion of the International Searching Authority (PCT/ISA/237) dated May 20, 2014 issued in application No. PCT/2014/057838.

* cited by examiner

GAS GENERATOR

FIELD OF INVENTION

The present invention relates to a gas generator used in a restraining device of an airbag system for a vehicle.

DESCRIPTION OF RELATED ART

Generally in a gas generator using a pressurized gas (pressurized medium), an opening portion of a bottle in which the pressurized gas is sealed is closed by a closing member and the pressurized gas is discharged by rupturing the closing member during activation.

The closing member is required to be reliably ruptured at the time of activation when a shock wave or pressure is generated, and when the closing member is ruptured by a shock wave or pressure generated by the activation of an ignition device using an explosive, or the like, it is preferred that a small load be sufficient for the rupturing.

US-A No. 2003/0146612 discloses a closure 50 to be ruptured by a gas pressure is mounted on an opening end of a cylindrical casing 40.

Grooves 52a to 52e of various shapes, such as shown in FIG. 2(a) to FIG. 2(e), are formed in the closure 50.

SUMMARY OF INVENTION

The present invention provides a gas generator, including:
a cylindrical housing having therein,
an ignition device chamber, which is provided with a gas discharge port and accommodates an ignition device, and
a pressurized gas chamber filled with a pressurized gas, the chambers being arranged such that central axes thereof are the same axis X1;
a closing member in a circular shape, closing between the ignition device chamber and the pressurized gas chamber, the closing member having a fragile portion on one surface thereof,
at least an igniter and a piston, which is movable in the axis X1 direction of the cylindrical housing at the time of activation, being disposed inside the ignition device chamber, the piston having,
a base plate including a pressure-receiving surface that receives a combustion product from the ignition device, and
a rod extending in an axial direction from one surface of the base plate, the rod being disposed to abut against or face the closing member,
the fragile portion being a groove formed with a curve extending from a start point A on Y1 to an end point E through a first intermediate point B on Y2, a second intermediate point C on Y1, and a third intermediate point D on Y2, where Y1 and Y2 are two straight lines drawn to be orthogonal to each other and to pass through a crossing point X2 on one surface of the closing member,
the groove being formed such that
distances from the crossing point X2 to the respective points satisfy the following relationship: the distance to the start point A<the distance to the first intermediate point B<the distance to the second intermediate point C<the distance to the third intermediate point D<the distance to the end point E, and
that the end point E is one of points E1, E2 and E3, wherein E1 is a point crossing Y1 after passing through the third intermediate point D on Y2, E2 is a point closer to the third intermediate point D than to the crossing point E1, and E3 is a point that has passed by the crossing point E1, by the rod moving in the axial direction and pushing the closing member at the time of activation, the closing member being ruptured along the groove from the vicinity of the start point A to the end point E of the fragile portion, and the rod being not to come in contact with the start point A but pushing the closing member at a position close to the groove between the start point A and the first intermediate point B.

BRIEF DESCRIPTION OF THE DRAWINGS

The present invention will become more fully understood from the detailed description given hereinbelow and the accompanying drawings which are given by way of illustration only, and thus are no limitative of the present invention and wherein.

DETAILED DESCRIPTION OF THE INVENTION

Figure 1:
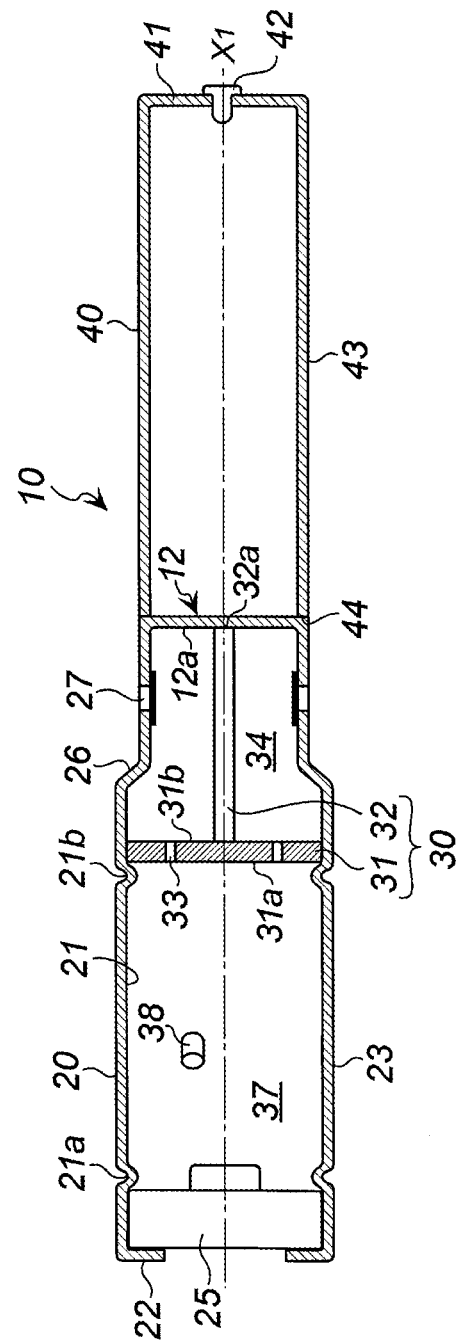
FIG. 1 is a cross-sectional view in the axial direction of a gas generator according to the present invention.

In US-A No. 2003/0146612, FIG. 2(a) and FIG. 2(d) indicate that the closure is ruptured and opened outward from the central portion considering the shape of the groove, whereas FIG. 2(c) and FIG. 2(e) indicate that, in view of the shape and formation state of the groove, the middle portion is separated as a unit and opened as a circle. FIG. 2(b) also indicates that, supposing the groove formed spirally with equal pitch from the center (the base point), the middle portion is separated as a unit and opened as a circle.

The present invention provides a gas generator in which a closing member can be reliably ruptured and opened by a small load when the gas generator is used in a restraining device such as an airbag system for a vehicle.

The gas generator in accordance with the present invention may be of a hybrid type in which the airbag is inflated by using both the pressurized gas and the combustion gas generated by combustion of a gas-generating agent, or of a stored type in which the airbag is deployed by the pressurized gas alone, without using the gas generating agent.

The cylindrical housing may be formed by a single housing as a whole or by a pressurized gas chamber housing forming a pressurized gas chamber and an ignition device chamber housing forming an ignition device chamber.

The closing member is present between the pressurized gas chamber and the ignition device chamber and may be fixed to or integrally formed with the housing.

When the housing is formed by the pressurized gas chamber housing and the ignition device chamber housing, the closing member may be fixed to either one of the housings or formed integrally with either one of the housings.

Since the closing member in circular shape is disposed inside the cylindrical housing, it is preferred that the center of the closing member be taken as X1 so that the axis X1 of the cylindrical housing passes through the center of the closing member.

The crossing point X2 of the closing member may or may not coincide with the center X1 of the closing member.

The fragile portion is formed on the surface of the closing member that directly faces the piston or on the opposite surface thereof.

The groove of the closing member is formed as a curve connecting points from the start point A to the end point E.

The curve connecting the points forms, as a whole, an about single-turn spiral passing through the respective points, rather than a zigzagging portion such as a wavy line.

The groove serving as a fragile portion can have a V-like, rectangular, or trapezoidal cross-sectional shape in the width direction.

The groove serving as a fragile portion may be a continuous or discontinuous groove. However, when a discontinuous groove is provided, the gaps between the adjacent grooves are adjusted so as to enable the rupture to advance along the grooves at the time of activation.

The end point E of the groove may be set apart from the circumferential portion of the closing member or may reach the circumferential portion.

In the gas generator in accordance with the present invention, the piston is moved by the shock wave or pressure generated from the ignition device at the time of activation, and the distal end portion of the rod pushes the closing member.

As a result, the rupture starts from the start point A which is the closest to the crossing point X2, or from any portion between the start point A and the first intermediate point B, and the rupture and opening proceed continuously to the end point E through the first intermediate point B, the second intermediate point C, and the third intermediate point D.

At the initial stage of the rupture, the area of opening formed in the closing member is small and an amount of discharged gas is also small, but as advancing toward the end point E, the area of opening increases and an amount of discharge gas also increases.

In other words, an output is suppressed in the initial stage of the activation, but the output is increased in the latter course of the operation. As a result, such a gas generator is obtained that, when a gas generator is used in combination with a restraining device such an airbag, an impact on a vehicle occupant in the initial stage of activation is moderated (the first operation effect).

In the gas generator in accordance with the present invention, a load is concentrated by the rod of the piston in part of the closing member, and a rupture is started from this part. It is preferred that a diameter of the rod be less than a pressure-receiving surface (a surface facing the ignition device) of the piston.

Therefore, once a rupture is started as a result of load concentration in the vicinity of the start point A, as described hereinabove, a force needed to advance the rupture continuously to the end point E is not required to be so large. In other words, the load is needed only to start a rupture in the vicinity of the start point A, and once the rupture is generated, no additional load is required. Therefore, the necessary maximum load is reduced by comparison with the case in which the entire fragile portion is ruptured at once, as in US-A No. 2003/0146612. Thus, the ignition device can be downsized and a lightweight gas generator can be provided (the second operation effect).

The present invention includes the following preferred aspects.

The gas generator in accordance with the present invention, described above, is provided in which the closing member has a fragile portion on one surface thereof, the fragile portion is a groove formed in a shape of a circle or an ellipse extending from a start point A to an end point E and having a center (X3) different from the center (X1) of the closing member, but the groove is not formed on the circumference of the circle or the ellipse where the start point A and the end point E are close to each other, and distances from the center (X1) of the closing member to the start point A and to the end point E satisfy the following relationship: the distance to the start point A<the distance to the end point E.

The first and second operation effects can be also exhibited by such a gas generator.

Further, since the shape of the groove itself is simplified by comparison with the above-described groove passing from the start point A to the end point E through the first intermediate point B, the second intermediate point C, and the third intermediate point D, the processing operation is facilitated.

In accordance with the present invention, it is preferred that the length of a portion, which is located from the start point A to the end point E and in which the groove is not formed, is within a range of 5% to 40% of the circumferential length of the circle or the ellipse.

In the gas generator in accordance with the present invention, the end point E preferably has a rupture-stopping means in the fragile portion.

By providing the rupture-stopping means, it is possible to prevent the rupture which has reached the end point E from advancing. Therefore, ruptured pieces are not generated and the gas discharge path is not closed by the torn-out ruptured pieces.

Any rupture-stopping means may be used as long as it can stop the rupture and prevent the rupture that has reached the end point from advancing.

For example, a method for attaching another member of a certain thickness to the end point E, a method for hardening the organization at the end point E by heating, such as welding, and a method for dispersing the stresses that have reached the end point E can be used.

In a stress dispersing method, the stress-dispersing portion disclosed in JP-A No. 2005-238948 (for example, the stress-dispersing portion shown in FIG. 1 and described in paragraphs [0029]-[0032]) and the rupture-blocking portion disclosed in JP-A No. 2012-171362 (for example, the rupture-blocking portion 14 shown in (a) in FIG. 1 and described in paragraph [0047]) can be used as a stresses dispersing means.

In the gas generator in accordance with the present invention, since the closing member sealing the pressurized gas chamber housing has a specific fragile portion, the rupture is started from the start point A or the vicinity thereof and the rupture advances continuously along the fragile portion to the end point E, and thus the closing member is opened.

Therefore, not only the force required for the rupture can be decreased, but the rupture advances continuously and the area of the opened portion increases continuously, which is suitable as a gas generator that moderates an impact on the occupant produced by the inflation of the airbag in the initial stage of activation.

DESCRIPTION OF EMBODIMENTS

In a gas generator 10, a cylindrical ignition device chamber housing 20 and a cylindrical pressurized gas chamber housing 40 are joined and integrated to form an outer shell container (a single housing).

The ignition device chamber housing 20 and the pressurized gas chamber housing 40 are integrated such that the central axes thereof coincide with the axis X1.

In the pressurized gas chamber housing 40, an opening at one end of a cylindrical circumferential wall portion 43 is closed with a bottom surface 41.

The pressurized gas chamber housing 40 is filled with a gas such as argon or helium. The gas is filled from a pressurized gas filling hole formed in the bottom surface 41, and the filling hole is closed by welding together with a pin 42.

In the ignition device chamber housing 20, an opening at one end of a cylindrical circumferential wall portion 23 is closed with a closing member 12, and the closing member 12 is joined to and integrated with an opening 44 at the other end of the pressurized gas chamber housing 40.

In FIG. 1, the closing member 12 is formed integrally with the circumferential wall portion 23, but the closing member 12 produced as a separate member may be welded and fixed to the circumferential wall portion 23.

Further, the closing member 12 may be attached to the opening (at the opposite side of the bottom surface 41) of the pressurized gas chamber housing 40.

An opened end portion 22 (the opening opposite to the closing member 12) of the ignition device chamber housing 20 is closed by an electric igniter 25 fixed thereto.

The electric igniter 25 is fixed by being interposed in the axis X1 direction between an annular protrusion 21a, which protrudes inwardly and is formed in an inner wall surface 21 of the ignition device chamber housing 20, and the opened end portion 22 crimped inwardly.

A piston 30 is disposed on the side of the closing member 12 in the ignition device chamber housing 20. A filling chamber 37 filled with a gas-generating agent 38 is formed between the piston 30 and the igniter 25.

The piston 30 has a base plate 31 having a pressure-receiving surface 31a facing the filling chamber 37 and a rod 32 extending from a surface 31b on the other side of the pressure-receiving surface 31a.

The space bounded by the piston 30 (the base plate 31), the inner wall surface 21 (the circumferential wall portion 23) of the ignition device chamber housing 20, and the closing member 12 is defined as a plenum chamber 34 serving as a gas discharge path. A known coolant or filter may be disposed inside the plenum chamber 34.

A plurality of gas discharge ports 27 are formed in the circumferential wall portion 23 facing the plenum chamber 34. A sealing tape is attached from inside to the gas discharge ports to prevent moisture penetration.

The base plate 31 abuts against and is movable along the inner wall surface 21 of the ignition device chamber housing 20.

The base plate 31 has a plurality of through holes 33 in the thickness direction. The plurality of through holes 33 may be closed with an aluminum adhesive tape or the like which is easily fractured.

The rod 32 is positioned on the axis same as the axis X1 of the housing and has the constant outer diameter from a distal end portion 32a to the base plate 31. The diameter of the rod 32 is less than the outer diameter of the base plate 31.

The base plate 31 abuts against and is movable along the inner wall surface 21 of the ignition device chamber housing 20.

The base plate 31 has a plurality of through holes 33 in the thickness direction. The plurality of through holes 33 may be closed with an aluminum adhesive tape or the like which is easily fractured.

The rod 32 is positioned on the axis same as the axis X1 of the housing and has the constant outer diameter from a distal end portion 32a to the base plate 31. The diameter of the rod 32 is less than the outer diameter of the base plate 31.

The piston 30 is fixed in the axis X1 direction by the base plate 31 abutting against an annular protrusion (a first protrusion) 21b formed in the inner wall surface 21 of the ignition device chamber housing and the distal end portion 32a of the rod 32 abutting against the closing member 12.

Even when the closing member 12 receives the inner pressure of the pressurized gas chamber housing 40, the pressure is dispersed in the ignition device chamber housing 20 through the rod 32 and the base plate 31. Therefore, the closing member 12 is not required to be exceedingly thick to increase pressure resistance.

A slight gap may be provided between the distal end portion 32a and the closing member 12. In this case, the distal end portion 32a of the rod 32 can abut against the closing member 12 when the closing member 12 receives the pressure from the pressurized gas chamber housing 40 and deforms to protrude toward the ignition device chamber housing 20.

A step portion (a second protrusion) 26 is formed between the annular protrusion 21b and the closing member in the inner wall surface 21 of the ignition device chamber housing.

At the time of activation, the base plate 31 slides between the annular protrusion 21b and the step portion (the second protrusion) 26.

The closing member 12 has, on one surface 12a (a surface on the side of the plenum chamber 34), a fragile portion 11 that is preferentially ruptured at the time of activation.

Figure 2:
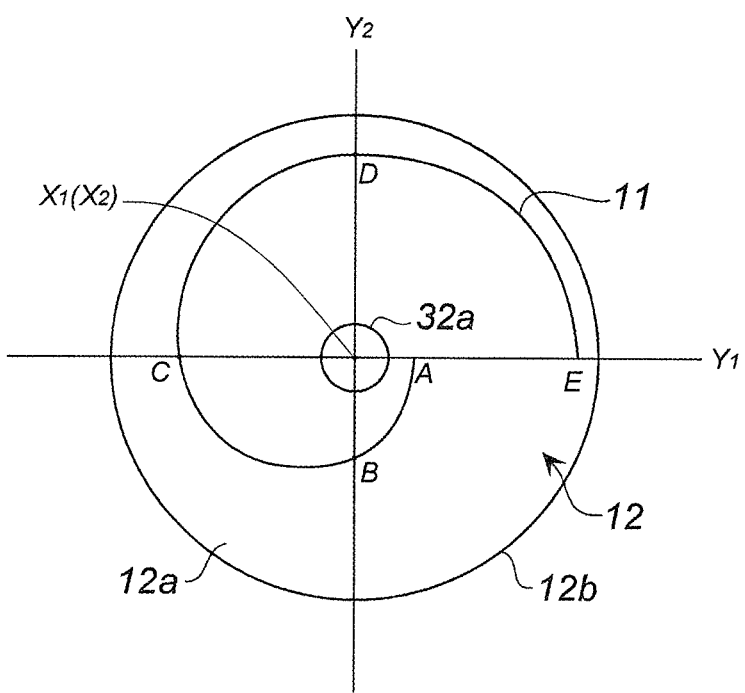
FIG. 2 is a plan view for explaining the fragile portion formed in the closing member, and a portion pushed by the distal end portion of the rod at the time of activation is shown by a solid line.

As shown in FIG. 2, in which two straight lines Y1 and Y2 are drawn orthogonally to each other (with a crossing point X2), the fragile portion 11 is a curved groove (for example, a groove with a V-like cross-sectional shape in the width direction) extending from a start point A on Y1 to an end point E on Y1 via a first intermediate point B on Y2, a second intermediate point C on Y1, and a third intermediate point D on Y2.

The crossing point X2 coincides with a center X1 (coincides with the axis X1) of the closing member 12.

As described hereinabove, the curved groove corresponds to a curve passing through the abovementioned points and forming, as a whole, about one-turn (one-round) spiral.

The groove forming the fragile portion 11 is formed such that the distances from the center X1 to the respective points satisfy the following relationship: the distance to the start point A<the distance to the first intermediate point B<the distance to the second intermediate point C<the distance to the third intermediate point D<the distance to the end point E, and that the start point A is at a position that is not in contact with the rod of the piston at the time of activation.

The distal end portion 32a of the rod 32 is adjusted to be positioned so that the distal end portion 32a pushes a region including the crossing point X2 at the time of activation (a region including the center X1 when the crossing point X2 coincides with the center X1).

At this time, the center of the distal end portion 32a of the rod 32 may or may not coincide with the crossing point X2 and the center X1.

The size of the distal end portion 32a of the rod 32 shown in FIG. 1 is one embodiment. The size of the distal end portion 32a is not limited to that shown in FIG. 1. The distal end portion 32a may be located at the position, for example, closer to any portion on the curve connecting the start point A with the first intermediate point B.

The position of the end point E may be such as to be beyond the third intermediate point D and not to be beyond the first intermediate point B.

Figure 3:
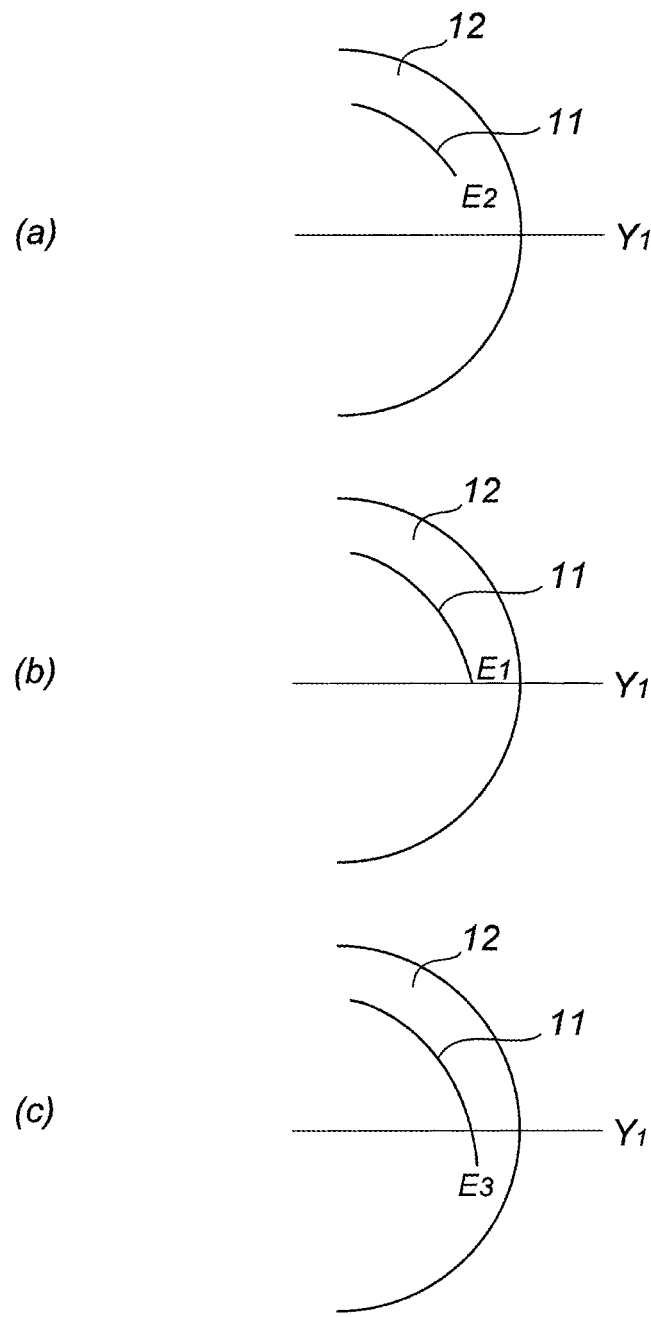
FIG. 3 is a view illustrating the positions of the different end points E (E1 to E3) of the groove forming the fragile portion.

The end point E may be positioned at any of
a point (E1) crossing Y1 as shown in (b) in FIG. 3;
a point (E2) on the side of the third intermediate point D with respect to the crossing point (E1); and
a point (E3) that has passed by the crossing point (E1).

Where a groove is formed with a single-round curve from the start point A to the end point E1 (a groove is formed with a curve forming a single-turn spiral), the position of the end point E2 is preferably at or greater than 0.5 round and less than 1 round, more preferably at or greater than 0.6 round and at or less than 0.9 round, even more preferably at or greater than 0.7 round and at or less than 0.8 round, and even more preferably at 0.75 round.

Where a groove is formed with a single-round curve from the start point A to the end point E1 (a groove is formed with a curve forming a single-turn spiral), the position of the end point E3 is preferably greater than 1.0 round and at or less than 1.5 round, more preferably at or greater than 1.1 round and at or less than 1.3 round, even more preferably at or greater than 1.2 round and at or less than 1.3 round, and even more preferably at 1.25 round.

Therefore, the preferred range of the groove formed with the curve from the start point A to the end point E (the end point E2, the end point E1, or the end point E3) is from a groove formed with a curve forming a 0.75-round (0.75-turn) spiral to a groove formed with a curve forming a 1.25-round (1.25-turn) spiral.

The end point E is preferably not in contact with a circumferential portion 12b of the closing member 12, but may be in contact therewith.

The fragile portion 11 can be provided with a rupture-stopping means for preventing a further rupture beyond the end point E.

Figure 4:
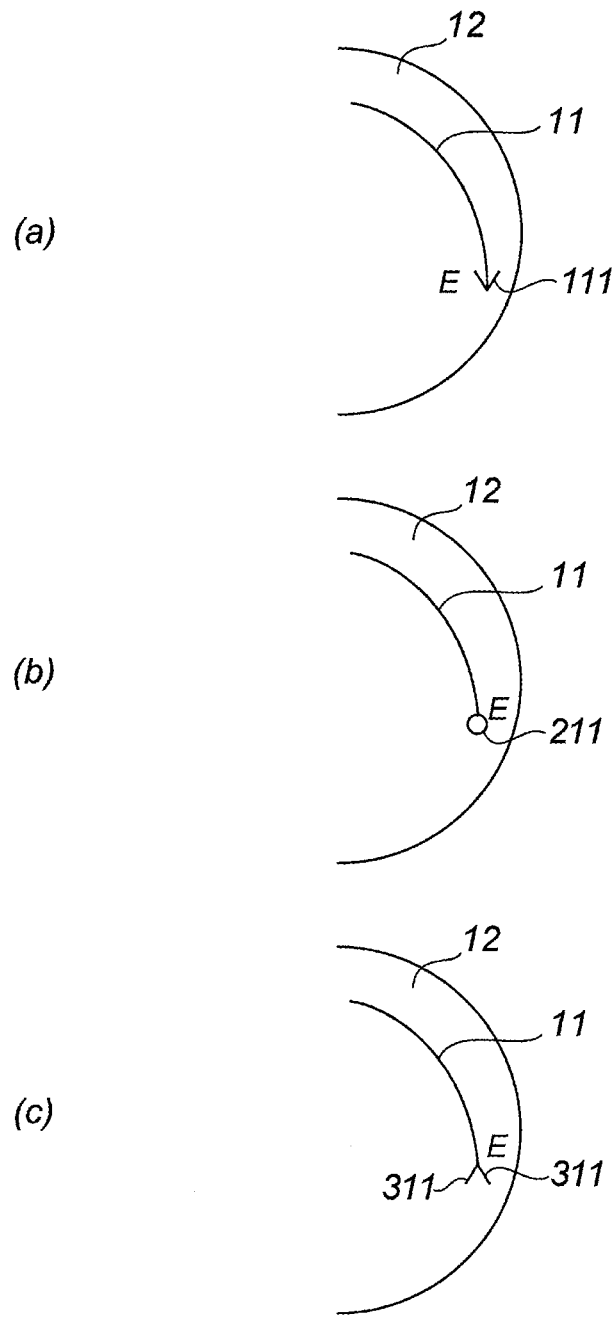
FIG. 4 is a partial plan view for illustrating the rupture-stopping means of the fragile portion formed in the closing member.

A rupture-stopping means 111 shown in (a) in FIG. 4 is an arrow-shaped groove formed at the end point E of the groove serving as the fragile portion 11. The end point E and the arrow-shaped groove (the rupture-stopping means 111) are in contact with each other, but may be also disposed at a short distance from each other.

A rupture-stopping means 211 shown in (b) in FIG. 4 is a recess (preferably a circular recess) formed at the end point E of the groove serving as the fragile portion 11. The end point E and the recess (rupture-stopping means 211) are in contact with each other, but may be also disposed at a short distance from each other.

A rupture-stopping means 311 shown in (c) in FIG. 4 is a V-shaped groove formed at the end point E of the groove serving as the fragile portion 11. The end point E and the V-shaped groove (rupture-stopping means 311) are in contact with each other, but may be also disposed at a short distance from each other.

With the rupture-stopping means shown in (a) to (c) in FIG. 4, when the rupture advances to the end point E, a force acting to cause the rupture at the rupture-stopping means is dispersed. As a result, the rupture is prevented from advancing.

The operation of the gas generator (a hybrid-type gas generator) shown in FIG. 1 is explained hereinbelow with respect to the case in which the gas generator is used in a restraining device of an airbag system for a vehicle.

When the igniter 25 is activated, the gas generating agent 38 located inside the filling chamber 37 is ignited and burned, thereby generating a combustion gas.

Part of the generated combustion gas enters the plenum chamber 34 from the through holes 33, the sealing tape is ruptured, and the gas is discharged from the gas discharge ports 27 to inflate the airbag.

Figure 5:
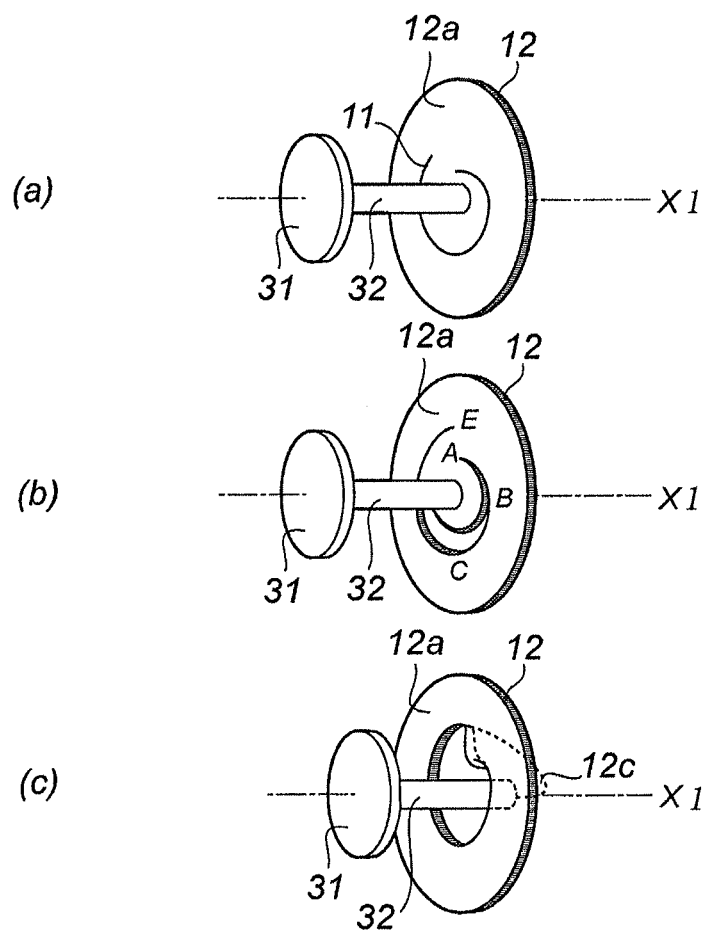
FIG. 5 is a perspective view for explaining the operation (a rupture state of the closing member) of the gas generator in accordance with the present invention.

Meanwhile, when the pressure inside the filling chamber 37 rises due to generation of the combustion gas, the base plate 31 of the piston 30 is pushed in the axis X1 direction from the state shown in (a) in FIG. 5, and the rod 32 moves in the axis X1 direction.

At this time, the base plate 31 collides with the step portion 26, thereby stopping the movement of the rod 32 in the axis X1 direction.

Because of the movement of the rod 32, the distal end portion 32a thereof is pressed against the portion of the closing member 12 including the center X1, and a rupture starts from the start point A, which is close to the center X1, along the groove.

After the rupture has started, it advances along the groove through the start point A (or between the start point A and the first intermediate point), the first intermediate point B, the second intermediate point C, and the third intermediate point D, in the order of description (see (b) in FIG. 5), and eventually the closing member 12 is opened (see (c) in FIG. 5).

In the state shown in (c) in FIG. 5, the ruptured piece 12c remains integrated with the closing member 12.

Thus, the load applied by the distal end portion 32a of the rod 32 is concentrated in a very narrow region on the closing member 12, and the rupture starts from the start point A located close thereto.

At this time, since the sheared area is small at the start point A, the applied load is small.

Once the rupture has advanced, it further advances in a continuous manner, and a small load is sufficient therefor.

In other words, the necessary maximum load (force) is reduced by comparison with the case in which the entire closing member 12 is ruptured and opened at once. Therefore, the igniter 25 is reduced in size and weight.

Note that, since the gas generator 10 shown in FIG. 1 is of a hybrid type using the gas generating agent 38, there is no direct correlation between the miniaturization of the igniter 25 and the fragile portion 11 of the closing member 12, and the gas generator 10 has an advantage that a larger portion of the combustion gas generated from the gas generating agent 38 is used for airbag deployment.

However, in the case of a stored gas generator in which the airbag is deployed only by the pressurized gas, the closing member is ruptured by the igniter alone. Therefore, the igniter is reduced in size and weight by combining with the closing member 12 having the above-described fragile portion 11.

A closing member 112 having a fragile portion 111 of another embodiment will be explained hereinbelow with reference to FIG. 6.

The fragile portion 111 is a groove formed in a shape of a circle or an ellipse extending from a start point A to an end point E and having a center (X3) different from the center X1 of the closing member 112.

However, the groove (the fragile portion) is not formed on the circumference of the circle or the ellipse where the start point A and the end point E are close to each other.

The distance from the center X1 of the closing member 112 to the start point A and the distance from the center X1 to end point E satisfy the following relationship: the distance to the start point A<the distance to the end point E.

The length of a portion, which is located from the start point A to the end point E and in which the groove is not formed, is preferably within a range of 5% to 40% of the circumferential length of the circle or the ellipse.

Figure 6:
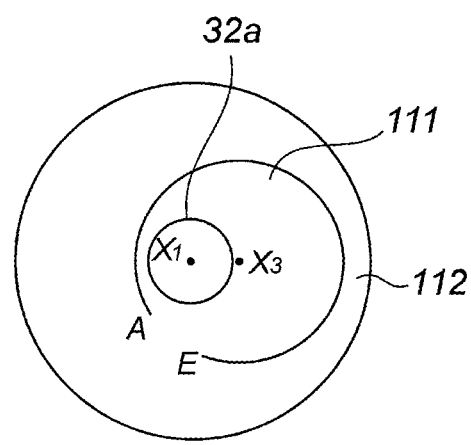
FIG. 6 is a plan view for explaining the fragile portion formed in the closing member of another embodiment, and a portion pushed by the distal end portion of the rod at the time of activation is shown by a solid line.

When the closing member 112 shown in FIG. 6 is used in the gas generator 10 shown in FIG. 1, the rupture advances as a result of the same operations as those shown in (a) to (c) in FIG. 5.

Since there is a portion from the start point A to the end point E where the groove is not formed, the ruptured piece is not separated from the closing member 112.

The invention thus described, it will be obvious that the same may be varied in many ways. Such variations are not to be regarded as a departure from the spirit and scope of the invention, and all such modifications as would be obvious to one skilled in the art are intended to be included within the scope of the following claims.

The invention claimed is:

1. A gas generator, comprising:
a cylindrical housing having therein,
an ignition device chamber, which is provided with a gas discharge port and accommodates an ignition device, and
a pressurized gas chamber filled with a pressurized gas, the chambers being arranged such that central axes thereof are the same axis X1;
a closing member in a circular shape, closing between the ignition device chamber and the pressurized gas chamber, the closing member having a fragile portion on one surface thereof,
at least the ignition device, and a piston which is movable in a direction to the closing member along the axis X1 at the time of activation of the ignition device, being disposed inside the ignition device chamber, the piston having,
a base plate including a pressure-receiving surface that receives a combustion product from the ignition device, and
a rod extending from one end of the base plate to the direction to the closing member along the axis X1, the rod being disposed to abut against or face the closing member,
the fragile portion being a groove formed with a curve extending from a start point A on Y1 to an end point E through a first intermediate point B on Y2, a second intermediate point C on Y1, and a third intermediate point D on Y2, where Y1 and Y2 are two straight lines drawn to be orthogonal to each other and to pass through a crossing point X2 on one surface of the closing member, the groove being formed such that
distance from the crossing point X2 to the respective points satisfy the following relationship: the distance to the start point A<the distance to the first intermediate point B<the distance to the second intermediate point C<the distance to the third intermediate point D<the distance to the end point E, and
that the end point E is one of points E1, E2 and E3, wherein E1 is a point crossing Y1 after passing through the third intermediate point D on Y2, E2 is a point closer to the third intermediate point D than to the crossing point E1, and E3 is a point that has passed by the crossing point D1, and wherein
by the rod moving along the axial direction and pushing the closing member at the time of activation, the closing member being ruptured along the groove from the vicinity of the start point A to the end point E of the fragile portion, and
the rod pushing the closing member at a position offset from the start point A but close to the groove between the start point A and the first intermediate point B.

2. The gas generator according to claim 1, wherein
the axis X1 passes through a center of the closing member, and the center X1 of the closing member and the crossing point X2 coincide with each other.

3. The gas generator according to claim 2, wherein
a rupture-stopping means is provided at the end point E in the fragile portion.

4. The gas generator according to claim 1, wherein
the axis X1 passes through a center of the closing member, and the center X1 of the closing member and the crossing point X2 do not coincide with each other.

5. The gas generator according to claim 4, wherein
a rupture-stopping means is provided at the end point E in the fragile portion.

6. The gas generator according to claim 1, wherein
the fragile portion is a groove formed in a shape of a circle or an ellipse extending from the start point A to the end point E and having a center X3 different from the center X1 of the closing member, but the groove is not formed on a circumference of the circle or the ellipse where the start point A and the end point E are closest to each other, and
a distance from the center X1 of the closing member to the start point A and a distance from the center X1 to the end point E satisfy the following relationship: the distance to the start point A<the distance to the end point E.

7. The gas generator according to claim 6, wherein
the length of a portion, which is located from the start point A to the end point E and in which the groove is not formed, is within a range of 5% to 40% of the circumferential length of the circle or the ellipse.

8. The gas generator according to claim 7, wherein
a rupture-stopping means is provided at the end point E in the fragile portion.

9. The gas generator according to claim 6, wherein
a rupture-stopping means is provided at the end point E in the fragile portion.

10. The gas generator according to claim 1, wherein
a rupture-stopping means is provided at the end point E in the fragile portion.

11. The gas generator according to claim 10, wherein the rupture-stopping means is an arrow-shaped groove, a recess, or a V-shaped groove, which are formed at the end portion E of the groove which is in contact with or is disposed at a distance from the end portion E.

12. The gas generator according to claim 1 wherein the base plate has a plurality of through holes in a thickness direction and the plurality of through holes are closed with an aluminum adhesive tape.

13. The gas generator according to claim 1, wherein the piston is fixed by the base plate abutting against an annular protrusion formed in an inner wall surface of the ignition device chamber and a distal end portion of the rod buts against the closing member.

* * * * *